No. 611,856. Patented Oct. 4, 1898.
D. A. BROWN & F. M. WILLIAMS.
BICYCLE HOLDER.
(Application filed Jan. 6, 1898.)
(No Model.)
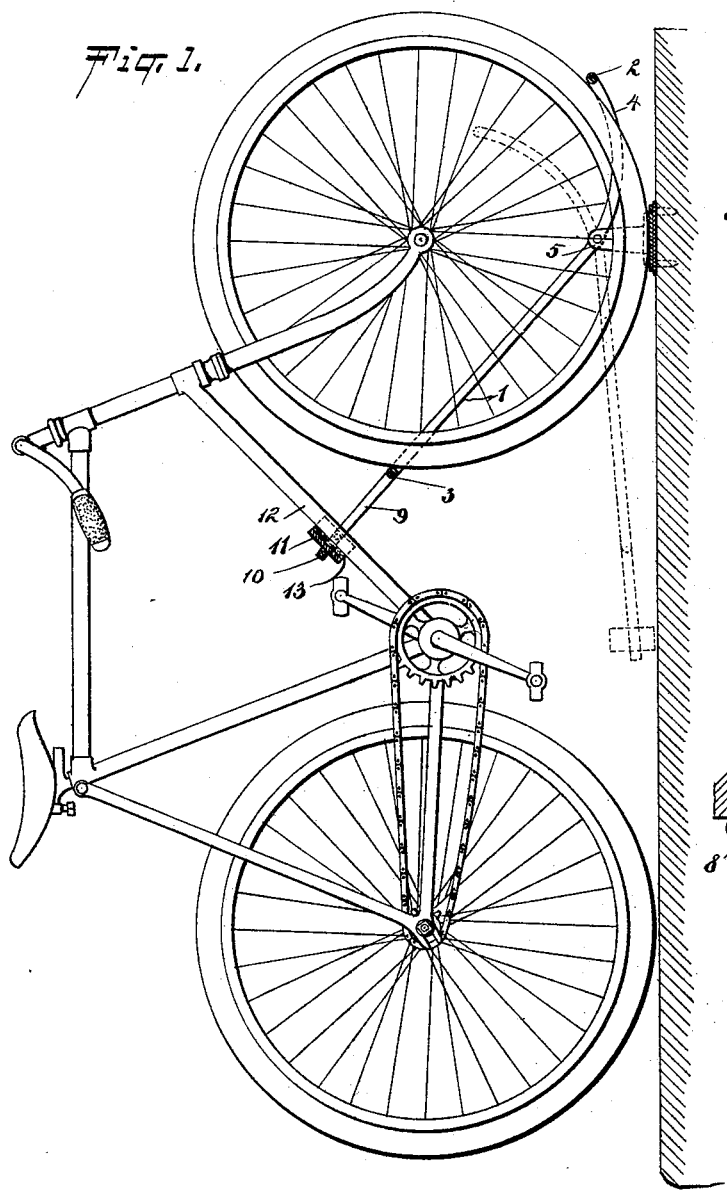
WITNESSES:
William P. Goebel
C. R. Ferguson
INVENTORS
D. A. Brown
F. M. Williams
BY
ATTORNEYS.

UNITED STATES PATENT OFFICE.

DAVID A. BROWN, OF WOODBRIDGE, NEW JERSEY, AND FRANK M. WILLIAMS, OF BELLEVILLE, NEW YORK.

BICYCLE-HOLDER.

SPECIFICATION forming part of Letters Patent No. 611,856, dated October 4, 1898.

Application filed January 6, 1898. Serial No. 665,815. (No model.)

*To all whom it may concern:*

Be it known that we, DAVID A. BROWN, of Woodbridge, in the county of Middlesex and State of New Jersey, and FRANK M. WILLIAMS, of Belleville, in the county of Jefferson and State of New York, have invented a new and Improved Bicycle-Holder, of which the following is a full, clear, and exact description.

This invention relates to certain improvements in holders or supports for bicycles; and the object is to provide a device of this character of a simple and comparatively inexpensive construction which shall be adapted to firmly and securely support a bicycle against the wall or side of a building, baggage-car, or the like, the support being so constructed and arranged as to be adapted to fold in a compact manner when the bicycle is removed, whereby economy of space is effected.

We will describe a bicycle-support embodying our invention and then point out the novel features in the appended claims.

Reference is to be had to the accompanying drawings, forming a part of this specification, in which similar characters of reference indicate corresponding parts in all the views.

Figure 1 is a partial section and partial side view of a bicycle-support embodying our invention and showing a bicycle as suspended therefrom. Fig. 2 is a front view of the support. Fig. 3 is a section on the line 3 3 of Fig. 2, and Fig. 4 is a detail view showing the frame-engaging plate employed.

The support comprises a loop consisting of the side members 1, connected together at the top and bottom, as at 2 and 3. The upper portion of the loop is curved forward, as at 4, and at the junction of the curve and the straight side members the loop has pivotal connection with lugs 5, extended outward from a plate 6, removably engaged with a keeper-plate 7, attached to the wall of a building, car, or the like. The opposite ends of the plate 6 converge downward, or, in other words, the plate is of keystone shape. These opposite ends are designed to engage in converging guides or sockets at the ends of the plate 7. The guides or sockets are formed by turning the ends of the plate 7 outward and then inward, as at 8. By this construction it is obvious that the support may be removed from the keeper-plate by lifting the plate 6 therefrom, and by a reverse operation the support may be quickly placed in position.

From the lower end of one side member of the loop an arm 9 extends downward and terminates in a hook portion 10, within which is pivoted a frame-engaging plate 11. This plate 11 is transversely curved or concaved, and it is mounted to rock longitudinally, so as to adapt itself to the pitch of the lower front brace 12 of a bicycle-frame, with which it is designed to engage. To prevent marring the brace, the plate 11 may be provided with a pad 13. It will be noted that the transverse center of the plate 11 is in line with the longitudinal center line of the loop.

When the support is not in use, it will swing inward, as indicated in dotted lines in Fig. 1, so that it occupies very little space or projects but slightly from the wall. When a bicycle is to be supported, it must be lifted up and its front-wheel tire engaged with the upper end 2 of the support. Then by lifting the bicycle still higher the lower portion will swing outward, so that the plate 11 may be engaged with the brace 12, as plainly shown in Fig. 1. By this device the bicycle will be suspended entirely free of the floor, and as the front wheel is within the loop the wheel is prevented from turning laterally.

Having thus described our invention, we claim as new and desire to secure by Letters Patent—

1. A bicycle-support, comprising a loop mounted to swing on a vertical wall, the upper portion of the loop being curved forward, an arm extended from the lower end of the loop, and a frame-engaging plate on said arm, substantially as specified.

2. A bicycle-support, comprising a loop mounted to swing on a vertical wall, the loop above its pivotal point being curved forward, an arm extended from the lower end of the loop and having a hook end, and a concave plate pivoted in said hook, substantially as specified.

3. A bicycle-support, comprising a loop adapted to engage both its ends with a bicycle-wheel, an arm extended from the lower end of the loop and adapted to engage with the bicycle-frame, a plate to which the loop is pivoted, and a plate having a socket to receive the first-named plate, substantially as specified.

DAVID A. BROWN.
FRANK M. WILLIAMS.

Witnesses to the signature of David A. Brown:
JAS. V. FREEMAN,
C. E. ZIMMERMANN.

Witnesses to the signature of Frank M. Williams:
D. M. KELSEY,
W. E. SCOTT.